United States Patent [15] 3,678,098
Lewis et al. [45] July 18, 1972

[54] UNSATURATED QUATERNARY MONOMERS AND POLYMERS

[72] Inventors: Sheldon N. Lewis, Willow Grove; Richard F. Merritt, Fort Washington; William D. Emmons, Huntington Valley, all of Pa.

[73] Assignee: Rohm and Haas Company, Philadelphia, Pa.

[22] Filed: April 4, 1969

[21] Appl. No.: 813,724

[52] U.S. Cl. .........................260/89.5 N, 117/124, 117/132, 117/140, 117/142, 117/148, 117/155, 117/169, 162/168, 260/28.5, 260/29.6, 260/78.5, 260/79.3, 260/79.7, 260/85.5 ES, 260/86.1 N, 260/86.3, 260/86.7, 260/88.3 A, 260/89.7, 260/348, 260/486, 260/847, 260/897, 260/898, 260/901
[51] Int. Cl. .......................C08f 3/64, C08f 3/66, C08f 15/26
[58] Field of Search...............260/486, 348 A, 486 H, 486 R, 260/89.5 N, 86.1 N

[56] References Cited
UNITED STATES PATENTS 3,418,301  12/1968  Spivey..............................260/486 X
3,497,482  2/1970  Hwa..................................260/486 X

*Primary Examiner*—Harry Wong, Jr.
*Attorney*—Carl A. Castellan and George W. F. Simmons

[57] ABSTRACT

This invention is concerned with monoethylenically unsaturated acid ester monomers, such as those of acrylic or methacrylic acid, containing a quaternary ammonium halide group having a substituent on the quaternary nitrogen atom of the formula —$CH_2CH(OH)CH_2X$ wherein X is chlorine, bromine or iodine. It is also concerned with addition polymers of such monomers, and methods of producing the monomers and polymers. The monomers and polymers are stable at acid pH values, although capable of reacting with other reactants for the hydroxyl and/or halide group. At alkaline pH values, they become self-reactive and the polymers crosslink themselves by slow reaction at room temperature. However, the reaction becomes quite rapid on heating.

9 Claims, No Drawings

UNSATURATED QUATERNARY MONOMERS AND POLYMERS

DISCUSSION OF PRIOR ART

U.S. Pat. No. 2,897,200 discloses the alkylation of various dialkylaminoalkyl vinyl ethers in free amine form with various agents including epichlorohydrin. In example 2 thereof, the patentee indicates that the quaternary nitrogen atom of the compound obtained from diethylaminoethyl vinyl ether has an oxirane group of the formula —CH$_2$CHCH$_2$O attached thereto. Examples 4 and 5 indicate copolymers are prepared therefrom by emulsion copolymerization.

U.S. Pat. Nos. 3,095,390 and 3,287,305 disclose alkylation of N-dialkylaminoalkyl amides of monoethylenically unsaturated acids, such as acrylic acid and methacrylic acid, in free amine form, with various agents including epichlorohydrin. In example 1 thereof, the patentee indicates that the quaternary nitrogen atom of the compound obtained from N-(diethylaminoethyl)-acrylamide has an oxirane group, — CH$_2$CHCH$_2$4 of the patent indicates copolymers are obtained therefrom by emulsion copolymerization.

U.S. Pat. No. 2,965,594 mentions alkylation of various basic dialkylaminoalkyl esters of acrylic acid, methacrylic acid, and so on by means of agents capable of converting the tertiary amino groups to quaternary ammonium groups and also introducing at the same time a carboxylic acid amido or an epoxy group, such as chloroacetamide or epichlorohydrin. There is no working example given for introducing an epoxy group. Actual experimental work on the reaction of such a basic aminoalkyl acrylate or methylacrylate has established that the glycidyl group rapidly undergoes undesirable transformations resulting in loss of epoxide functionality (one of which apparently involves conversion to an allyl alcohol group of the formula —CH=CHCH$_2$OH), and which promote the subsequent gelation of the product to an unusable solid of unknown complex composition when this monomer is polymerized or copolymerized with other vinyl monomers.

U.S. Pat. No. 3,150,112 discloses adding an epihalohydrin to a neutral or alkaline aqueous dispersion of an emulsion copolymer of a monomer containing —COOM groups (M being NH$_4$, alkali metals, or an amine radical) or groups having reactive hydrogen atoms, such as OH, primary or secondary amine groups, etc.

In accordance with the present invention, a hydrogen acid salt of a basic ester of the formula $$H_2C=C(R)-C(O)O-A-N(CH_3)_2 \cdot HY \quad (I)$$

is reacted under acid conditions with an epihalohydrin of the formula $$XCH_2-CHCH_2O \quad (II)$$

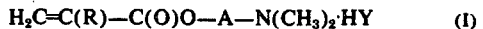

the symbols in the formula being as follows:

X is chlorine, bromine, or iodine,
R is hydrogen or methyl,
A is a (C$_2$–C$_6$) alkylene group having at least two carbon atoms in a chain between the adjoined O and N atoms or A may be a polyoxyalkylene group of the formula (CH$_2$CH$_2$O)$_x$CH$_2$CH$_2$ wherein $x$ is 1 to 11 or more, and
Y is an anion, such as a halogen ion (Cl$^-$, Br$^-$, or I$^-$) or the anion of any other acid, such as phosphate, acid phosphate, sulfate, bisulfate, methyl sulfate, carboxylate, sulfonate, sulfamate, acetate, formate, oxalate, acrylate, and α-methacryloxyacetate. Preferably, Y is the anion of an acid having an ionization constant, pK$_a$ of 5.0 or less, i.e. a dissociation such that the hydrogen ion concentration is at least 10$^{-5}$.

The reaction may be effected at room temperature to about 80°C. Generally, the procedure should be controlled to prevent the temperature exceeding about 80°C., preferably avoiding temperatures above 50°C. The reaction is most conveniently carried out in aqueous media, preferably water itself. The starting salts and the epihalohydrin are adequately water-soluble to make water entirely suitable as the reaction medium. The epihalohydrin is preferably used in stoichiometric amount or in excess thereof. The aqueous medium may contain an auxiliary water-miscible solvent when A is an alkylene group of four or more carbon atoms. No catalyst is needed for the reaction. It is, however, essential that the pH be maintained on the acid side during the reaction to prevent undesirable side reactions. The reaction is rapid even when started at room temperature. Its completion can be readily determined by following the drop in amine titre as the amine group is quaternized. Generally, the addition of epihalohydrin to the aqueous starting salt solution is made at as rapid a rate as is consistent with the control of the temperature in the reaction system.

A polymerization inhibitor may be present in the reaction medium. Examples include monomethyl ether of hydroquinone, hydroquinone and phenothiazine. The amount of inhibitor may be from 0.01 to 1 percent based on the weight of starting salt.

The carbon atoms of the A group of formula I may be in a simple straight chain or may be in branched-chain arrangement. However, it is preferred that the carbon atom of A that is attached directly to the nitrogen atom has at least one hydrogen attached directly to it to assure that the reaction is not sterically hindered. One of the hydrogen atoms in one or more or all of the ethylene groups of the polyoxyethylene group representing A may by replaced by a methyl group.

The epihalohydrin may be epiiodohydrin or epibromohydrin, but is preferably epichlorohydrin. Similarly, the salt of the polymer may be any of the hydro acid salts, such as hydroiodide or hydrobromide, but is preferably the hydrochloride. One or both of the methyl groups on the nitrogen atom may be cyclohexyl or another alkyl group, but the compound of formula I in which these groups are both methyl reacts so much more rapidly with the epihalohydrin than that in which they are ethyl that it is believed the dimethyl compound is the best one from a practical standpoint.

The monomeric products of the present invention have the following formula in which the symbols are the same as defined hereinabove.

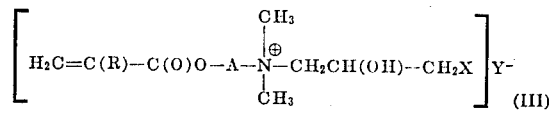

$$\left[ H_2C=C(R)-C(O)O-A-\overset{CH_3}{\underset{CH_3}{\overset{\oplus}{N}}}-CH_2CH(OH)-CH_2X \right] Y^- \quad (III)$$

They are obtained in high yield (over 90 percent) in aqueous reaction medium. The products of the reaction may be concentrated or even isolated from the reaction medium in which they are dissolved by vaporization of the water, preferably under vacuum. However, they can be stored in the form of their aqueous solutions as obtained.

The products are polymerizable and for this purpose, their aqueous solutions may be used directly. Any known polymerization initiator of free radical type effective in aqueous systems can be used. Examples are t-butyl hydroperoxide, ammonium persulfate, and alkali metal persulfates, such as those of sodium or potassium. They are used at the customary dosage of 0.1 to 2 percent by weight, based on monomer weight. They may be used with sodium hydrosulfite or other reducing agents in redox systems. Instead, the polymerization may be effected by radiation.

These new quaternary ammonium salt monomers may be copolymerized with other polymerizable ethylenically unsaturated monomers, especially by emulsion polymerization procedures, using the initiators or redox systems just mentioned in conjunction, if desired, with suitable emulsifiers of nonionic or cationic type. As emulsifiers, there may be used t-octyl- or t-nonyl-phenoxypolyethoxyethanols having from about 10 to 50 or more oxyethylene groups, octadecylamine sulfate, cyclohexyldiethyl(dodecyl) amine sulfate, octadecyltrimethylammonium bromide, polyethoxyamines or mixtures of two or more such emulsifiers.

Any ethylenically unsaturated monomer having a group

may be used for copolymerization with the new monomers of formula III under conditions such that the polymerization medium is maintained at an acid condition, preferably at a pH of not over 6. Examples of monoethylenically unSaturated monomers having a single

group include vinyl esters of ($C_1$–$C_{18}$)aliphatic acids, such as vinyl acetate, laurate, and stearate; esters of acrylic acid or methacrylic acid with ($C_1$–$C_{18}$)alcohols, including ($C_1$–$C_{18}$)alkanols, benzyl alcohol, cyclohexyl alcohol, and isobornyl alcohol, such as methyl acrylate or methacrylate, ethyl acrylate or methacrylate, butyl acrylate or methacrylate, or 2-ethylhexyl acrylate or methacrylate, octadecyl acrylate or methacrylate; vinyl aromatic hydrocarbons (e.g., styrene, isopropenyl toluene, and various dialkyl styrenes); acrylonitrile methacrylonitrile, ethacrylonitrile, and phenylacrylonitrile; acrylamide, methacrylamide, ethacrylamide, N-methylol acrylamide, N-monoalkyl and -dialkyl acrylamides and methacrylamides, e.g., N-monomethyl, -ethyl, -propyl, -butyl, and N-dimethyl, -ethyl, -propyl, -butyl, etc. alkacrylamides, e.g., N-monophenyl- and -diphenyl-acrylamides and -methacrylamides; vinyl ethers, such as butyl vinyl ether; N-vinyl lactams such as N-vinyl pyrrolidone; and olefins, such as ethylene; fluorinated vinyl compounds, such as vinylidene fluoride; β-hydroxyethyl acrylate or methacrylate or any of the hydroxyl-containing or amine-containing monomers mentioned in columns 2 and 3 of U.S. Pat. No. 3,150,112; vinyl chloride and vinylidene chloride; alkyl vinyl ketones; e.g., methyl vinyl ketone, ethyl vinyl ketone, and methyl isopropenyl ketone; itaconic diesters containing a single

grouping, e.g., the dimethyl, diethyl, dipropyl, dibutyl and other saturated aliphatic monohydric alcohol diesters of itaconic acid, diphenyl itaconate, dibenzyl itaconate, di-(phenylethyl) itaconate; allyl and methallyl esters of saturated aliphatic monocarboxylic acid, e.g., allyl and methallyl acetates, allyl and methallyl propionates, allyl and methallyl valerates; vinyl thiophene; 4-vinyl pyridine; and vinyl pyrrole.

The monomers of formula III are directly useful for copolymerization with acrylonitrile to modify the antistatic, dyeing, and moisture regain properties thereof. The resulting copolymer containing 0.2 to 5 percent by weight of the quaternary ammonium compound of the present invention can be formed into fibers which can be formed into textile yarns and fabric which show reduced tendency to develop static charges on frictional contact, better dyeing, especially by acid dyes, and better feel because of increased moisture adsorption or regain. Instead of copolymerizing the monomer of the invention directly with the acrylonitrile to form the main component of fibers of films, a homopolymer or copolymer of the monomer of formula III with one or more other monomers, such as vinyl acetate, ethyl acrylate, styrene or vinyl benzene sulfonate, may be blended in relatively small amount with the acrylonitrile polymer which forms the predominant components of the fiber or film that is subsequently formed from the blend.

A compound of formula III may be used for the sizing of paper. A small amount in the range of 0.2 to 5 percent or more by weight Of the compound based on dry fiber weight, may be mixed into the paper pulp in the beater or shortly before or after the pulp leaves the beater. A polymerization initiator may be added to the pulp at the same time or shortly before or after the addition of the monomer of formula III. The effect obtained in the dry paper produced therefrom varies in dependence on the pH of the system. If the pulp is at a pH of less than 7, the paper obtained shows a sizing effect. If the pulp is neutral or alkaline or is rendered alkaline, such as at a pH of 8 to 10, at some point prior to drying of the formed sheet, increased wet strength is also obtained.

In either case an aqueous dispersion of neutral or acid-containing polymers such as poly(ethyl acrylate) obtained by emulsion polymerization may also be added to the pulp. In such event the monomer of formula III, or a polymer formed thereof in situ serves to anchor the additional polymer to the fibers. Instead of such additional polymer, there may be added an aqueous dispersion of a wax, such as polyethylene, of a pigment or mineral filler, or of a material, such as a long chain alcohol-modified urea formaldehyde resin, such on subsequent calendaring of the paper serves to transparentize it.

An alternative method of preparing the polymers of the present invention is to react an epihalohydrin with a polymer containing from 0.25 to 100 percent by weight of an amine salt of formula I supra. Such polymer may be obtained by polymerizing the amine salt of formula I directly or by polymerizing the corresponding amine in free base form and then neutralizing it with a hydrogen acid to form the salt of the amine polymer. Numerous methods of polymerizing (including copolymerizing within the meaning of this term) the amine salts of formula I and the corresponding amines in free base form are well known and any of these methods may be used. Conventional emulsion or suspension polymerization techniques may be employed. Any of the comonomers listed above for copolymerization with the quaternary ammonium compound of formula III may be used as comonomers with the amine salts of formula I or the corresponding amine in free base form.

The reaction of the epihalohydrin and the polymer salt may be carried out in the same way and under the same conditions as that of the epihalohydrin and the monomer of formula I. The polymer may be dissolved in water or it may be present in the form of an aqueous latex obtained by emulsion polymerization. The epihalohydrin is used in the stoichiometric equivalent proportion to convert whatever proportion of amine units in the polymer to quaternary ammonium units that is desired, or a slight excess (up to 25 percent) may be used.

Reaction of the amine salt polymer (whether homopolymer or copolymer) with the epihalohydrin provides a polymer having units containing quaternary ammonium groups of the formula

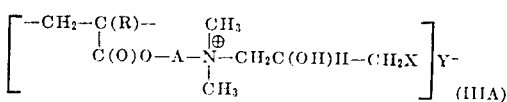

along with some units of the formula

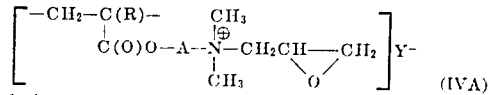

The relative amounts of IIIA and IVA will vary depending on the exact reaction conditions but, in a typical case, they will be present in roughly equivalent amounts. Lowering of the pH apparently reduces the proportion of IVA. At pH values of 6 or less, the propensity for gelation attributable to the glycidyl group of IVA is inhibited whereas raising the pH to neutral or alkaline conditions results in rapid curing of the copolymer even at room temperature to an insoluble condition, the higher the pH and concentration of the polymer the more rapid the curing. Apparently, the groups IIIA are converted to IVA groups when the pH is made alkaline and the alkali-catalyzed transformations of the glycidyl groups can cause cure and insolubilization of the polymer.

If, however, the polymers of the present invention containing the functionality IIIA are diluted to very low solids (2–10 percent) in water at 5°–50°C., then the pH may be raised to 9–12 without gelation. The polymer so obtained is stable for a limited amount of time at low solids (2–10 percent) even though such a polymer cannot be stored indefinitely without gelation or loss of functionality. Polymers of the present invention when activated by this caustic treatment for a minimum period of 1-5 hours have been found two to three times more efficient as wet strength resins than they are prior to activation. This caustic activation process is of particular significance since polymers treated in such a way have special value as wet strength resins for paper when the paper is cured at a pH of 6–10. While the caustic activation process is not practical for the polymer manufacturer because of the previously mentioned stability problems and the required low solids (2–10 percent), it can be practical for the polymer user, such as a paper mill.

These properties of the polymers containing groups IIIA with or without nominal levels of the groups IVA enable the polymer manufacturer to make reasonably stable polymer compositions, such as latices thereof, and store and ship them to a user, such as a paper manufacturer, for application under any conditions of pH, e.g. at a pH of 2 to 5 for simple sizing, or at a pH of 7 to 11 or higher to cure the polymer in the paper to develop high wet strength.

Homopolymers of a compound of formula III or copolymers cOntaining both groups IIIA and IVA are generally water-soluble to an extent of at least 1 percent by weight at room temperature and in most cases dissolve to form aqueous solutions containing as much as 20 percent or more, the greater the concentration, the greater the viscosity.

The homopolymers are generally useful as flocculants, as in the clarification of water and aqueous suspensions. Thus, the addition to a sewage of about 0.01 to 0.5 percent by weight, based on the weight of suspended solids, of a homopolymer of a monomer of formula III, serves to flocculate the suspended matter and facilitate its removal by filtration or by settling and decantation. The homopolymers are thus useful in the flocculation of aqueous suspensions of many types, and especially of domestic and industrial wastes having neutral, acidic or alkaline character. As mentioned hereinbefore, they can be used as paper sizing and wet strength agents and as anchoring agents for other sizing materials applied in aqueous dispersions or suspensions. They are also effective as retention aids in the preparation of mineral filled papers wherein they enhance the anchoring of the filler to the fibers and thereby clarify the white water obtained The sizing and flocculation effects are generally effective at all pH values of the systems to which they are applied.

The treatment of paper pulp with the homopolymers (particularly after caustic activation) under neutral or alkaline conditions followed by beating provides a remarkable increase in wet strength. The amount of polymer applied for this purpose may range from 0.5 to 7 percent or more by weight, based on the dry weight of fiber in the pulp, the wet strength increasing with increase in proportion up to about 4 to 5 percent after which the wet strength levels off and the sizing effect increases.

The water-soluble copolymers containing 25 percent or more of units of formula IIIA whether or not units of formula IVA are also present therein and also those whose units consist essentially of units IIIA and IVA are useful for the same purposes as mentioned hereinabove for the homopolymers of a monomer of formula III. For use as a wet-strength resin for paper, the copolymers preferably contain about 35 to 100 percent of units of formula IIIA and units of IVA and for optimum performance these resins are subjected to the caustic activation process at 2–10 percent solids just before use.

Copolymers containing from 0.25 to 25 percent or more by weight of units of formula IIIA are useful for many purposes. For example, copolymers of acrylonitrile with 0.25 to 15 percent of units of formula IIIA are particularly useful for forming fibers and films having improved dyeability, greater resistance to the development of electrostatic charges by frictional contact, and better feel because of greater moisture adsorption. Copolymers of about 0.5 to 30 percent or more of a monomer of formula IIIA with an ester of acrylic acid or of methacrylic acid such as ethyl acrylate, butyl acrylate, 2-ethylhexyl acrylate, methyl methacrylate with or without styrene or vinyltoluene, are quite satisfactory for the stabilization of wool fabrics against shrinkage on washing, for the bonding of nonwoven fabrics, for the finishing of leather, as a binder for pigmented compositions, for the pigment-dyeing of textiles, for the production of mineral-coating papers, and for lithographic inks, for the sizing of paper, and as thermosetting coatings for application to metals, wood, plastics, glass, masonry of all types, plaster walls, etc.

To assist those skilled in the art to practice the present invention, the following modes of operation are suggested by way of illustration, parts and percentages being by weight and the temperature in °C. unless otherwise specifically noted.

1.a. A 4,000 ml. round-bottom four-neck flask fitted with a reflux condenser, two addition funnels, stirrer, and thermometer is charged with 2,600 g. of de-ionized water. The air is removed with a nitrogen purge and the water is heated to 55°C. One addition funnel is charged with 16 g. of ammonium persulfate dissolved in 200 g. of water. The other funnel is charged with the monomer emulsion prepared from 417 g. water, 63 g. of a 70 percent solution of t-octylphenoxypoly(40)ethoxyethanol, 400 g. of dimethylaminoethyl methacrylate and 400 g. of ethyl acrylate. Both monomer emulsion and initiator solutions are gradually added over a 1-hour period which is appropriate to maintain the polymerization temperature at 55°–56°C. The resulting aqueous polymer dispersion contains about 20 percent solids with a pH of 7.7. To 3,660 g. of this dispersion is added 183 g. of 37 percent HCl (1 equivalent). The dispersed polymer immediately becomes soluble, whereupon 220 g. ( 1.25 equivalent) of epichlorohydrin is added. After 24 hours at 25°C. amine titration indicates complete quaternization. The pH of the polymer solution is adjusted from 6.5 to 2 with 37 g. of 37 percent HCl. At this point, the resulting solution contains 24 percent polymer solids.

b. The quaternary ammonium polymer solution is diluted to 5 percent solids with water containing 14 percent by weight of NaOH based on polymer solids to provide a final pH of 11. After 1 hour, the pH falls to 9 and within 3 hours at 25°C., the polymer is ready for use. Further ageing at alkaline pH for a limited period is not detrimental. The effect of the alkaline pretreatment on wet strength properties is given in table 1. The procedure followed is:

c. Bleached kraft "Alberta Hi-Brite" pulp slurry is beaten at 2.5 percent solids to a Canadian Standard Freeness of 470 ml. and the pulp is diluted to 1 percent solids and adjusted to pH 7.8 with NaOH. The polymer solutions of paragraphs (a) and (b) are added to separate batches of the pulp at 1.0 percent solids based on dry pulp weight. The pulp is sheeted at a final consistency of 0.04 percent. The sheets are then dried at 200°F. for 2 minutes. The wet tensile strength (lbs./in.) is determined on a Scott 1P-4 tester, after immersion in 75°F. $H_2O$ for 1 hour.

TABLE 1

| Polymer Used | % Polymer on dry pulp | Wet Tensile (lbs./in.) 1 day | 28 days |
| --- | --- | --- | --- |
| Paragraph a) above | 1 | 4.1 | 7.6 |
| Paragraph b) above | 1 | 12.5 | 14.4 |
| Kymene 557* ...untreated | 1 | 9.4 | 12.1 |
| Kymene 557 ...base treated | 1 | 6.8 | 9.1 |

*A commercial polyamide resin bodied with epichlorohydrin having a pH of about 4, U. S. patent 2,926,116.

Shorter base treatment times than 3 hours or initial pH values below 11 produce polymers which provide wet strengths intermediate to those listed above.

2. The apparatus described in procedure (1) is used and the flask is charged with 2,600 g. of de-ionized water, purged with nitrogen and heated to 55°C. One addition funnel is charged with 4 g. of ammonium persulfate dissolved in 200 g. of water while the other contains a monomer emulsion prepared from 417 g. H$_2$O, 63 g. of a 70 percent solution of t-octylphenoxypoly(40)ethoxyethanol, 280 g. dimethylaminoethyl methacrylate, and 520 g. n-butyl acrylate. The initiator and monomer feeds are adjusted to maintain the polymerization at 55°–56C. and requires 1 hour. The polymer dispersion contains 19.4 percent solids with a pH of 8.1. To 300 g. of this dispersion is added 11 g. (1 equivalent) of 37 percent HCl dissolved in 300 g. of H$_2$O. The polymer immediately becomes soluble whereupon 13.2 g. (1.25 equivalents) of epichlorohydrin is added. After 3 days at 25°C., amine titration confirms the absence of polymeric amine and therefore complete quaternization. The ambient pH of 6.5 of the polymer solution is adjusted to 2.0 with 6.0 g. of 37 percent HCl and an 11.7 percent solids solution is obtained.

The resulting polymer is beater-deposited at various levels on bleached sulfite pulp in the manner described in (1c) above and the final paper sheets tested for sizing efficiency by measuring the change of brightness of the underside of each sheet while it supports on its upper surface an excess of a commercially available permanent blue-black ink (Skrip No. 232). Ink resistance is reported in terms of the number of seconds it takes for this brightness to drop from 100 to 70 percent. The instrument is calibrated by using a white sheet to represent 100 percent brightness. Table 2 below tabulates this data.

TABLE 2

| Polymer % by weight on weight of Dry Pulp | Seconds to 70% reflectance | |
|---|---|---|
| | 1 Day Age | Cured (300°F. 5 min.) |
| 0.5 | 562 | 666 |
| 1.0 | 2950 | 2050 |
| 2.0 | 5000 | 6000 |

3. A 22 liter 4-neck flask is fitted with thermometer, stirrer, condenser, and 4 addition funnels by means of appropriate adapters. The flask is charged with 6,000 g. of de-ionized H$_2$O and 25 ml. of 0.1 percent FeSO$_4$ solution. This solution is degassed with a nitrogen purge and heated to 65°C. The activation funnels (a, b, c, d) are charged in the following manner: (a) a solution of 1,200 g. dimethylaminoethyl methacrylate, 735 g. 37 percent HCl, and 735 g. de-ionized H$_2$O (b) 1,200 g. of methyl acrylate (c) a solution of 12 g. of ammonium persulfate in 900 g. of H$_2$O and (d) a solution of 12 g. of sodium metabisulfite in 900 g. of H$_2$O. Solutions a, c, and d are added uniformly over a 90-min. period whereas solution b is added over a 60-min. period. The rate is such that the temperature is maintained at 65°C. The polymer solution is cooled to 25°C. and 2,330 g. of H$_2$O) is added to provide a 19.3 percent solids solution. The solution is stirred and 885 g. (1.25 equivalents) of epichlorohydrin is added. After 16 hrs. at 25° C. the reaction is complete as judged by lack of amine titer. This 23.8 percent solids polymer solution is adjusted to pH 2 with 20 g. of 37 percent HCl.

4. A flask fitted with a thermometer, stirrer and an addition funnel is charged with 2,000 g. of de-ionized H$_2$O and 962 g. of 37 percent HCl. A supply of dimethylaminoethyl methacrylate (1,570 g.) is gradually added and the temperature maintained at 25°C. with external cooling. The epichlorohydrin (1,000 g.) is added all at once and the temperature maintained at 25°–30° for 8 hours. Amine titration of this solution confirmed the quaternization of the amine function. The 51.6 percent solution of quaternary monomer (Br No. =31.0, calcd. 28) is essentially entirely (>99 percent) in chlorohydrin form (formula III) (thiosulfate/oxirane ≤ 1 percent) and is utilized as a solution.

5. A 1,000 ml. 4-neck flask is fitted with a reflux condenser, thermometer, stirrer and 4 addition funnels by means of appropriate adapters. The flask is charged with 645 g. de-ionized H$_2$O and 1 ml. of 0.2 percent FeSO$_4$ solution and heated to 50°C. while being purged with nitrogen. The 4 addition funnels (a, b, c, d) contain: (a) 50 g. of methyl acrylate; (b) 250 g. of a 20 percent solution of the quaternary monomer obtained in (4) above; (c) 2 g. of ammonium persulfate dissolved in 25 g. H$_2$O; and (d) 2 g. sodium metabisulfite in 25 g. of H$_2$O. The additions are carried out over 0.5 hr. to maintain the temperature at 48°–50°C. The completely soluble resin copolymer at 12.7 percent solids is adjusted to pH 2 with 2 g. of 37 percent HCl.

6. A polymerization flask fitted with a stirrer, condenser and thermometer is charged with 200 g. of a 33.2 percent solution of the monomer of (4) above. The following initiator system is rapidly added: 0.4 ml. of a 0.1% FeSO$_4$ solution, 0.8 g. ammonium persulfate, and 0.8 g. sodium hydrosulfite. The exotherm beginS immediately and polymerization is complete within 0.5 hr. The solution is diluted with 133 g. of H$_2$O to 17 percent solids and the pH is adjusted to 2 with 1 g. of 37 percent HCl.

7. A reaction vessel similar to those previously described is charged with 632 g. of H$_2$O and 2 ml. of 0.1 percent FeSO$_4$ solution. This solution is heated to 70°C. and purged with nitrogen. The supply containers of all 4 (a, b, c, d) addition funnels are charged in the following manner: (a) a solution of 2.0 g. of ammonium persulfate in 50 g. of H$_2$O; (b) 2.0 g. of sodium metabisulfite dissolved in 50 g. of H$_2$O; (c) a monomer mixture of 90 g. of dimethylaminoethyl acrylate and 100 g. of methyl acrylate; and (d) 67.2 g. of 37 percent hydrochloric acid. The kettle is then primed with 7 ml. of the HCl solution and 5 ml. of the initiator solution. All the remaining solutions are gradually added over a 1-hr. period such that the temperature is maintained between 69° and 71°C. An additional 10 g. of dimethylaminoethyl acrylate is then added over a 5-min. period. The completed solution polymer has a pH of 3.1 at 23.7 percent solids. A 300 g. sample of this solution is diluted with 100 g. of H$_2$O and 23.6 g. (1.25 equivalents) of epichlorohydrin is added. After 18 hours at 25°, amine titer confirms complete quaternization whereupon 4.9 g. of 37 percent HCl is added to provide the final resin or polymer solids at 22.4 percent solids at pH 3.8.

8. A polymerization flask fitted with three addition funnels is charged with 148 g. of H$_2$O) and sparged with nitrogen while being heated to 55°C. The 3 funnels (a, b, c) are charged as follows: (a) a solution of 0.4 g. of sodium metabisulfite in 10 g. of H$_2$O; (b) a solution of 0.4 g. of ammonium persulfate in 10 g. of H$_2$O; and (c) a monomer emulsion consisting of 8 g. methyl methacrylate, 12 g. of N,N-dimethylaminoethoxyethyl methacrylate, 10 g. of H$_2$O and 1.4 g. of a 70 percent solution of tert-octylphenoxy-poly(40)ethoxyethanol. The solutions are gradually added over a 50-minute period to maintain the temperature at 55°C. Upon completion of the polymerization, a solution of 5.75 g. of 37 percent HCl in 300 g. of H$_2$O is slowly added. The dispersion immediately clarified to provide a 4.4 percent solids solution. To this solution (100 g.) is added 100 g. of H$_2$O and 1.29 g. of epichlorohydrin. Within 10 days at 25°C. the quaternization is complete and the 2.6 percent solids solution is then adjusted to pH 3 with 37 percent HCl.

9. The previously described polymerization flask is charged with 608 g. of H$_2$O and 2 ml. of 0.1% FeSO$_4$ solution. The contents are purged with nitrogen while being heated to 70°C. The 4 addition funnels (a, b, c, d) are charged as follows: (a) a solution of 2.0 g. of ammonium persulfate in 50 ml. of H$_2$O; (b) a solution of 2.0 g. of sodium metabisulfite dissolved in 50 ml. of H$_2$O; c) a monomer mixture of 100 g. of dimethylaminoethyl methacrylate and 100 g. of methyl acrylate; and (d) a solution of 31.8 g. of concentrated H$_2$SO$_4$ dissolved in 60 g. of H$_2$O. The additions are complete within an hour to provide a clear 22.9 percent solids polymer solution at pH 3.0. The polymer solution (300 g.) is treated with 22 g. of epichlorohydrin and quaternization is complete within 3 days at 25°C. The final resin at 26.8 percent solids is adjusted to pH 2 with H$_2$SO$_4$.

10. 5 percent aqueous solutions are prepared, as described in the first two sentences of (1b) hereinabove, of each of the following products:

1. Polymer obtained in (1a) above

2. Polymer obtained in (2) above
3. Polymer obtained in 3) above
5. Polymer obtained in (5) above
6. Polymer obtained in (6) above
7. Polymer obtained in (7) above
8. Polymer obtained in (8) above
9. Polymer obtained in (9) above The resulting alkaline solutions are applied to paper pulp at various levels in the manner described in (1c) above and papers are formed therefrom with the results given in table 3.

TABLE 3

| Polymer | Polymer % (wt.) Based On Dry Pulp (wt.) | Sheet Basis wt. lb./3000 sq. ft. | Wet Tensile (lb./in.) 1-Day | Wet Tensile (lb./in.) 28-Days |
|---|---|---|---|---|
| Control | 0 | 38 | | |
| 1 | 0.25 | 38 | 0.5 | 0.5 |
|  | 0.50 | 38 | 7.4 | 8.6 |
|  | 1.00 | 38 | 9.9 | 11.0 |
| 2 | 0.25 | 38 | 12.5 | 14.4 |
|  | 0.50 | 38 | 6.6 | 7.0 |
|  | 1.00 | 38 | 8.8 | 9.5 |
| 3 | 0.25 | 38 | 9.6 | 9.8 |
|  | 0.50 | 38 | 6.1 | 7.1 |
|  | 1.0 | 38 | 8.4 | 9.9 |
| 5 | 0.25 | 38 | 12.0 | 14.5 |
|  | 0.5 | 38 | 4.9 | 5.9 |
| 6 | 0.25 | 38 | 6.7 | 7.5 |
|  | 0.50 | 38 | 7.8 | 7.9 |
| 7 | 0.25 | 38 | 9.6 | 10.3 |
|  | 0.50 | 38 | 3.1 | 3.4 |
| 8 | 0.25 | 38 | 4.0 | 5.2 |
|  | 0.50 | 38 | 4.2 | 5.1 |
| 9 | 0.25 | 38 | 5.6 | 6.2 |
|  | 0.50 | 38 | 3.9 | 4.7 |
|  |  |  | 4.6 | 5.6 |

11. There is charged to a glass reaction vessel 978 g. of $H_2O$ and 2 ml. of 0.1% $FeSO_4$ solution. This solution is purged with nitrogen and heated to 70°C. The 3 addition funnels ($a, b, c$) are charged as follows: (a) 5.3 g. of ammonium persulfate dissolved in 56 g. of $H_2O$; (b) a solution of 5.3 g. of sodium metabisulfite in 56 g. of $H_2O$; and (c) a monomer emulsion consisting of: 100 g. of styrene, 100 g. of methyl methacrylate, 15.3 g. of a 70 percent solution of Triton tert-octylphenoxypoly(40)ethoxyethanol, and 130 g. of the 51.6 percent copolymer solution obtained in (4) above.

The additions are conducted concurrently such that the exotherm maintains the temperature at 70° and requires 2 hours. The completed copolymer dispersion is of 19.6 percent solids (20 percent theoretical) and has a viscosity of 5 centipoises.

We claim:

1. A compound of the formula

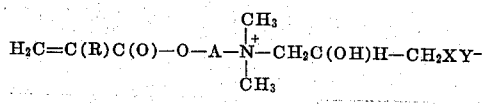

wherein
R is hydrogen or methyl,
X is iodine, bromine, or chorine,
A is a ($C_2$–$C_6$)alkylene group having at least two carbon atoms in a chain between the adjoined O and N atoms or A may be a polyoxyethylene group of the formula $(CH_2CH_2O)_xCH_2CH_2$ wherein $x$ is at least 1, and
Y is an anion.

2. A compound of the formula

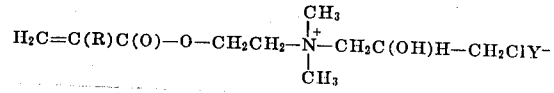

wherein
R is hydrogen or methyl and
Y is an anion.

3. A compound as defined in claim 2 in which Y is a halogen ion.

4. A monomeric material comprising a predominant amount of a compound of claim 1 and a compound of the formula

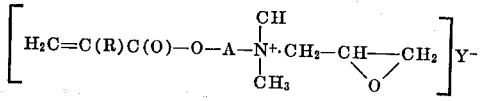

wherein R, A, and Y are as defined in claim 1, the latter compound being present in an amount up to about one-third the weight of the former.

5. A polymer of a compound of claim 1.
6. A polymer of a compound of claim 2.
7. A polymer of a compound of claim 3.
8. A copolymer of (1) about 0.25 to 99.5 percent by weight of a compound of claim 1 with (2) with at least one other monoethylenically unsaturated monomer having a group of the formula

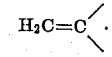

9. A method of preparing a compound as defined in claim 1 which comprises reacting, in an aqueous medium at a pH in the range of about 2 to 6, an epihalohydrin at room temperature to 80°C. with an amine salt of the formula

wherein
R is hydrogen or methyl,
X is chlorine, bromine, or iodine, and
A is a ($C_2$–$C_6$) alkylene group having at least two carbon atoms in a chain between the adjoined O and N atoms or A may be a polyoxyethylene group of the formula $(CH_2CH_2O)_xCH_2CH_2$ wherein $x$ is 1 to 11 or more, and
Y is an anion.

* * * * *

UNITED STATES PATENT OFFICE
CERTIFICATE OF CORRECTION

Patent No. 3,678,098         Dated July 18, 1972

Inventor(s) Sheldon N. Lewis, Richard F. Merritt and William D. Emmons

It is certified that error appears in the above-identified patent and that said Letters Patent are hereby corrected as shown below:

Col. 1, line 21 should read as follows:

$CH_2CHCH_2O$ attached thereto. Example 4 of the patent in-

Col. 6, Table 1, correct first two columns to read:

| Polymer Used | % Polymer on Dry Pulp |
|---|---|
| Paragraph a) above | 1 |
| Paragraph b) above | 1 |
| Kymene 557*...untreated | 1 |
| Kymene 557...base treated | 1 |

Col. 7, Table 2, correct first two columns to read:

| Polymer % by weight on weight of Dry Pulp | 1 Day Age |
|---|---|
| 0.5 | 562 |
| 1.0 | 2950 |
| 2.0 | 5000 |

UNITED STATES PATENT OFFICE
CERTIFICATE OF CORRECTION

Patent No. 3,678,098   Dated July 18, 1972

Inventor(s) Sheldon N. Lewis, Richard F. Merritt and William D. Emmons

It is certified that error appears in the above-identified patent and that said Letters Patent are hereby corrected as shown below:

Col. 9, Table 3 correct to read as follows:
(<u>Note</u> Table 3 continues on page 3)

Table 3

| Polymer | Polymer Percent (wt.) Based on Dry Pulp (wt.) | Sheet Basis Weight lb./3000 sq. ft. | Wet Tensile (lb./in.) 1-Day | 28-Days |
|---|---|---|---|---|
| Control | 0 | 38 | 0.5 | 0.5 |
| 1 | 0.25 | 38 | 7.4 | 8.6 |
|   | 0.50 | 38 | 9.9 | 11.0 |
|   | 1.00 | 38 | 12.5 | 14.4 |
| 2 | 0.25 | 38 | 6.6 | 7.0 |
|   | 0.50 | 38 | 8.8 | 9.5 |
|   | 1.00 | 38 | 9.6 | 9.8 |
| 3 | 0.25 | 38 | 6.1 | 7.1 |
|   | 0.50 | 38 | 8.4 | 9.9 |
|   | 1.0 | 38 | 12.0 | 14.5 |
| 5 | 0.25 | 38 | 4.9 | 5.9 |
|   | 0.5 | 38 | 6.7 | 7.5 |
| 6 | 0.25 | 38 | 7.8 | 7.9 |
|   | 0.50 | 38 | 9.6 | 10.3 |
| 7 | 0.25 | 38 | 3.1 | 3.4 |
|   | 0.50 | 38 | 4.0 | 5.2 |
| 8 | 0.25 | 38 | 4.2 | 5.1 |
|   | 0.50 | 38 | 5.6 | 6.2 |

UNITED STATES PATENT OFFICE
CERTIFICATE OF CORRECTION

Patent No. 3,678,098      Dated July 18, 1972

Inventor(s) Sheldon N. Lewis, Richard F. Merritt and William D. Emmons

It is certified that error appears in the above-identified patent and that said Letters Patent are hereby corrected as shown below:

| Polymer | Polymer Percent (wt.) Based on Dry Pulp (wt.) | Sheet Basis Weight lb./3000 sq. ft. | Wet Tensile (lb./in.) 1-Day | 28-Days |
|---|---|---|---|---|
| 9 | 0.25 | 38 | 3.9 | 4.7 |
|   | 0.50 | 38 | 4.6 | 5.6 |

Signed and sealed this 2nd day of January 1973.

(SEAL)
Attest:

EDWARD M. FLETCHER, JR.      ROBERT GOTTSCHALK
Attesting Officer      Commissioner of Patents

UNITED STATES PATENT OFFICE
CERTIFICATE OF CORRECTION

PATENT NO. : 3,678,098
DATED : July 18, 1972
INVENTOR(S) : Sheldon N. Lewis, Richard F. Merritt, William D. Emmons It is certified that error appears in the above-identified patent and that said Letters Patent are hereby corrected as shown below:

In line 3 of column 10 "chorine" should be --chlorine--.

In column 10, line 37, (line 2 of claim 8) "with (2) with at least" should read --with (2) at least--.

In line 46 of column 10, --of the formula $XCH_2-CHCH_2O$-- should be inserted after "epihalohydrin".

Signed and Sealed this ninth Day of September 1975

[SEAL]

Attest:

RUTH C. MASON
Attesting Officer

C. MARSHALL DANN
Commissioner of Patents and Trademarks